United States Patent

Schmid

[15] 3,686,493

[45] Aug. 22, 1972

[54] LIMITED AVERAGE VOTER CIRCUITRY

[72] Inventor: Hermann Schmid, Binghamton, N.Y.

[73] Assignee: General Electric Company

[22] Filed: Nov. 13, 1970

[21] Appl. No.: 89,183

[52] U.S. Cl. ..................235/193, 307/219, 318/564, 328/116

[51] Int. Cl. ..........................................H03k 19/42

[58] Field of Search.........235/193, 184, 153, 151.13, 235/92 CA; 318/564; 325/304; 307/235, 204, 211, 219; 328/152, 147, 173, 116, 137, 154; 244/77 M, 77 V, 77 SE; 324/71

[56] References Cited

UNITED STATES PATENTS

| | | | |
|---|---|---|---|
| 3,530,381 | 9/1970 | Hogg et al. | 235/92 CA |
| 3,243,585 | 3/1966 | Escobosa | 235/193 |
| 3,363,111 | 1/1968 | Moreines | 307/235 |
| 3,420,993 | 1/1969 | Chamberlain et al. | 235/184 |
| 3,476,922 | 11/1969 | Yiotis | 325/304 |
| 3,551,776 | 12/1970 | Tawfik | 318/564 |

*Primary Examiner*—Joseph F. Ruggiero
*Attorney*—Francis K. Richwine, Irving M. Freedman, Frank L. Neuhauser, Oscar B. Waddell and Joseph B. Forman

[57] ABSTRACT

Electronic computer and control circuitry providing for redundancy by use of plural parallel channels and for selection of the proper output by limiting the difference between each input signal and the output signal and selecting an output based on the average of the limited signals. A specific analog circuit embodying the concept is described.

13 Claims, 6 Drawing Figures

INVENTOR:
HERMANN SCHMID,
BY Francis K. Richwine
HIS ATTORNEY.

Patented Aug. 22, 1972

3,686,493

2 Sheets-Sheet 2

INVENTOR:
HERMANN SCHMID,
BY Francis K. Richwine
HIS ATTORNEY.

LIMITED AVERAGE VOTER CIRCUITRY

BACKGROUND OF INVENTION

1. Field of the Invention

Redundancy of electronic circuitry, particularly for control application has become more important as the potential results of loss of control have been magnified. Aircraft especially are subjects for the application of redundancy techniques.

To obtain high reliability, various computing and control circuits must be operated redundantly (i.e., a plurality of parallel channels). Since each of these channels produces an output, a problem thus exists in deciding which of the plurality of outputs should be used for the product of the circuit. If all of the circuit channels operated perfectly, all of the outputs would be identical, and it would not matter which signal were selected. However, if one, or two of the circuits fail, only one of the remaining good outputs is to be used. The purpose of a voter circuit is to always select one of the correct output signals.

In analog computing or control systems the problem is further complicated because the redundant circuits are neither perfect nor identical. Their output signals normally have relatively large tolerances. For example, in an aircraft flight control system the variations in magnitude may be as large as ±5 percent under perfectly normal conditions. Yet, an analog voter circuit must be able to select the output that is closest to the closest to the correct value.

2. Prior Art

Previous analog voters employed two basic principles: Median Value Selection and Averaging. Median value selection requires the selection of one of the input signals as representative which is closest to the median value of the inputs. Averaging is the production of a signal having a value equal to the sum of the inputs divided by the number of inputs.

Median value selection voters are implemented with $n$ sets of analog comparators, $n$ digital logic circuits and $(n \cdot n)$ analog switches, where $n$ is the number of redundant channels. Each set of comparators determines which of the signals is the median value. The logic circuits convert the comparator outputs to a set of suitable signals that control the analog switches, which in turn select the channel with the median value. A quadruplex analog voter using this principle requires $4 \times 6$ analog comparators, four logic networks and $4 \times 4$ analog switches. Consequently, analog voters using this principle are large in size, complex and expensive.

In contrast, averaging of redundant analog signals can be performed with relatively few circuits. For example, a quadruplex averaging analog voter can be implemented with only four operational amplifiers and twenty resistors. However, the performance of averaging voters is very unsatisfactory. When one of the input signals fails, the voter output signal amplitude is still $$V_o = (V_A + V_B + V_C + V_D)/4$$

where $V_A$, $V_B$, $V_C$ and $V_D$ are the voltage analog input signals to a quadruplex analog voter. Under those conditions $V_o$ is no longer a correct presentation of the average. Assuming $V_A = V_B = V_C = +10V$ and $V_D$ failing to $-10V$, the desired value of the output is $+10V$. But the output of the average voter in this case according to the equation above is $+5V$. Hence, it is in error by $5V$ or 50 percent of the full scale value of the desired output signal.

SUMMARY OF INVENTION

The present invention also applies an averaging voting technique, but the circuit is arranged so as to greatly reduce the effect of an erroneous input signal on the output signal. This is achieved by limiting the difference between each input signal and the averaged output signal by connecting conventional germanium, silicon or hot carrier diodes between each input signal branch and the output of the summing amplifier. Therefore, the analog voter of this invention retains the simplicity of the average voter, but offers significantly improved performance over previous-art average voters.

Thus, it is the principal object of the invention to provide an improved analog voter which produces an output that is the average of all inputs that are within a specified tolerance, i.e., that is within an established differential of the output established by the remaining inputs.

Another object of the invention is to provide a low cost analog voter that requires neither precision resistors, offset-free comparators, or electronic analog switches.

A further object of the invention is to provide a very reliable analog voter, containing a minimum of components.

DESCRIPTION OF THE PREFERRED EMBODIMENT

Figures 1, 2:
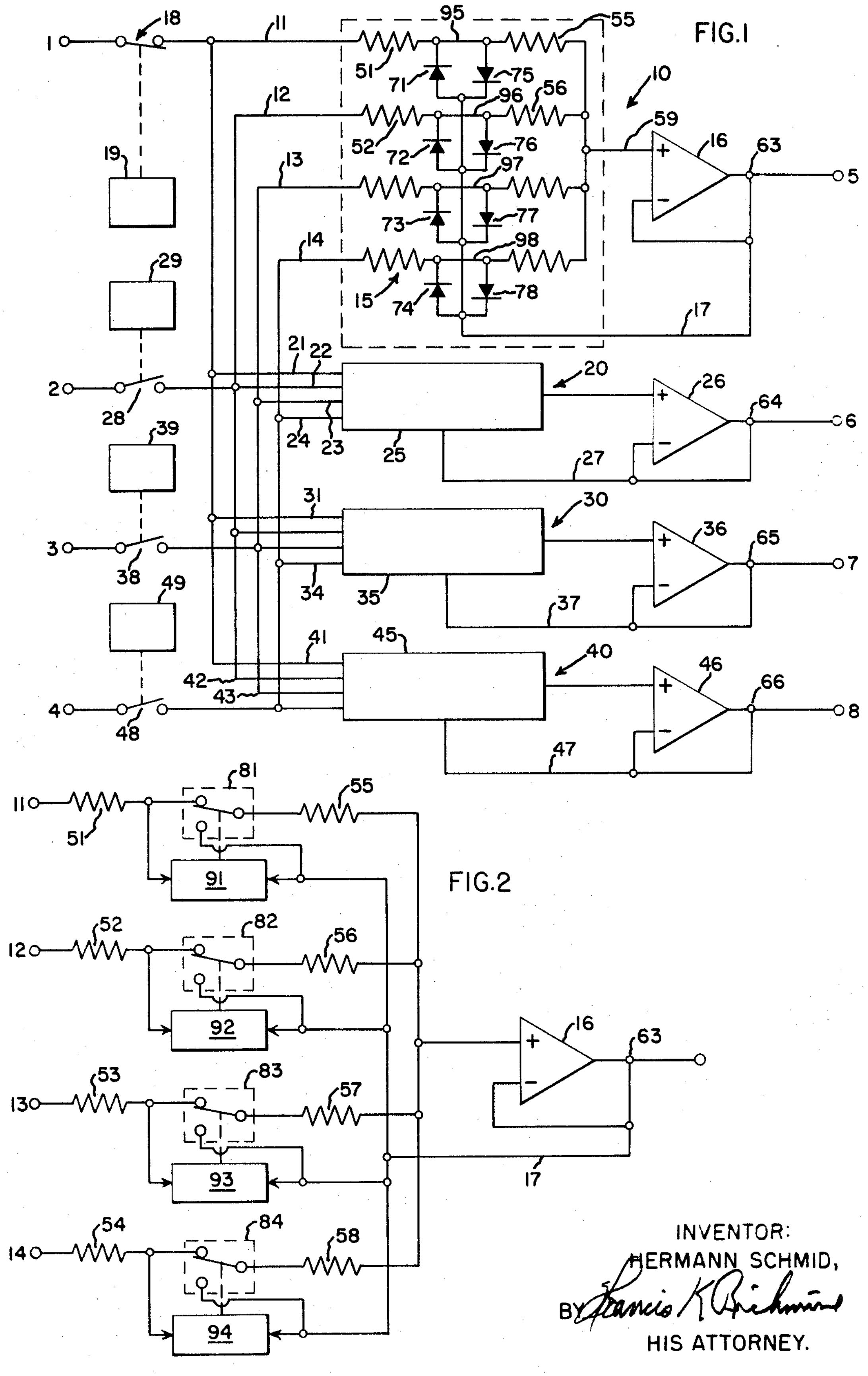
FIG. 1 is a diagram of a quadruplex limited average voter employing this invention but having only one channel in detail.
FIG. 2 is an idealized version of one channel of a limited average voter according to this invention.

FIG. 1 illustrates the circuitry of a preferred embodiment of a quadruplex limited average voter according to this invention. The preferred circuitry contains four identical channels arranged between four common input terminals and a single output terminal for each channel. One channel 10 is illustrated in detail while the other three 20, 30 and 40 are illustrated in functional schematic form. The channels are connected to each of the input terminals 1, 2, 3, and 4 by an input net having leads 11, 12, 13, 14, 21, 22, etc. Each channel also has a single output terminal 5, 6, 7 and 8 respectively and contains a resistor-diode network 15, 25, 35 and 45, a d-c amplifier 16, 26, 36 and 46 and a feedback connection 17, 27, 37 and 47 at the potential of the output terminal 63, 64, 65, 66 of the amplifiers. The dc amplifiers are non-inverting unity gain amplifiers or voltage followers and can be implemented by using as for example that of a commercially available integrated circuit such as Fairchild μA741 which is a catalogue item. Each network is identical to that illustrated in channel 10 and contains four branches. Each branch contains two resistances 51, 55; 52, 56; etc. and interconnects a common output 59 with one lead of the input net 11, 12, etc. Each branch also contains a pair of diodes 71, 75; 72, 76 connected with opposite polarity to the node between the resistances and to feedback 17. This arrangement of diodes and resistances provides for limiting or switching dependent on the magnitude of current flowing between input and output terminals. The circuitry may also be provided with control, test, monitor or disconnect switches 18, 28, 38, 48 and switch actuating mechanisms 19, 29, 39, 49 for any number of purposes.

Figure 3:
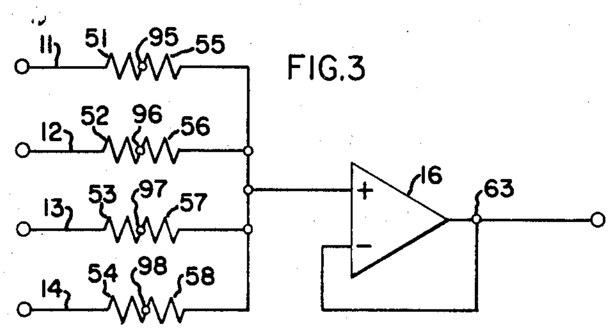
FIGS. 3, 4 and 5 are schematics of circuits equivalent to the ideal voter.
Figure 4:
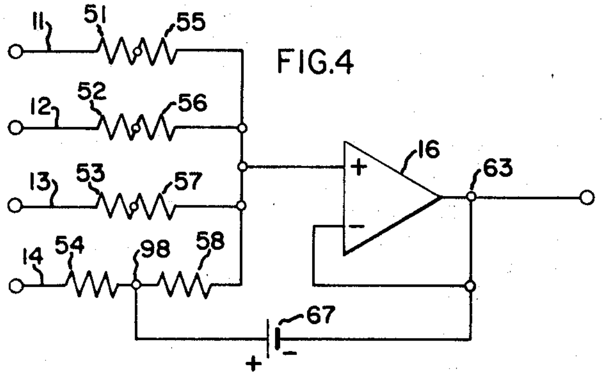

Operation of the preferred embodiment and particularly the limiting function is most easily understood through reference to and analysis of the idealized versions of the circuits as illustrated in FIG. 2 and the equivalent circuits for different modes of operation as illustrated in FIGS. 3 and 4. Referring more specifically to the idealized version of FIG. 2, a quad limited-average voter channel can be regarded as being comprised functionally of one dc amplifier 16 and a network equivalent to the resistor-diode network of FIG. 1 which also has four branch circuits. Each branch circuit contains one analog series shunt switch 81, 82, 83, 84; one threshold detector 91, 92, 93, 94; and two non-precision resistors to which are applied the same reference numbers as the corresponding resistors in FIG. 1. Each pair of resistors, e.g., 51, 55 is used as a voltage divider between the branch input and the amplifier input. The shunt switch as 81 of each branch is connected between the resistances so that either the output of the input resistor (as 51) or the output 63 of the amplifier is connected to the other resistor (as 55). A threshold detector 91 is connected between the node 95 of the resistance and the output 63 of the amplifier to operate switch 81 between two positions depending on whether the output of threshold detector 91 is high (ONE) or low (ZERO).

In normal operation, i.e., with a voltage in the range of ±10 volts applied to the input terminals (as is common in the aircraft flight control art), and with the input voltages $V_1$, $V_2$, $V_3$, $V_4$, at 11, 12, 13, 14 respectively being within tolerances and the voltage difference between nodes 95, 96, 97, 98 and the output $V_o$ at 63 being greater than the permissible tolerance of the input voltage, the output of the threshold detectors is ZERO and the switches remain in the position illustrated. This causes the circuit to operate as the equivalent circuit illustrated in FIG. 3. This circuit performs like a non-inverting amplifier with multiple inputs and if $R_{51}+R_{55}=R_{52}+R_{56}=R_{53}+R_{57}=R_{54}+R_{58}$, the output $V_o$ at 63 resulting from input voltages $V_1$, $V_2$, $V_3$, $V_4$ applied through 11, 12, 13 and 14 respectively would be:

$$V_o=(V_1+V_2+V_3+V_4)/4 \qquad (1)$$

This circuit performs as a true averager and the preferred embodiment of FIG. 1 under conditions in which the diodes are effectively off would act in such manner.

There are several failure modes of operation. Explanation is best approached through examination of the most simple one, the mode where only one signal, e.g., $V_4$ fails.

When $V_4$ is different from $V_o$ by more than the specified tolerance, the output of its threshold detector, 94, becomes ONE. In this case, switch 84 disconnects node 98 from resistor 58 and connects the output voltage from 63 to resistor 58. The equivalent circuit for this case is shown in FIG. 4 (without the battery 67 which is included for a purpose to be discussed later). The output voltage of the ideal voter (without battery) can be calculated from Kirckhoff's current law equations as:

$$\frac{V_1-V_0}{R_{51}+R_{55}}+\frac{V_2-V_0}{R_{52}+R_{56}}+\frac{V_3-V_0}{R_{53}+R_{57}}+\frac{V_0=V_0}{R_{58}}=0 \qquad (2)$$

and $$V_o=(V_1+V_2+V_3)/3 \qquad (3)$$

Similarly, it can be shown that when two signals fail, e.g., $V_3$ and $V_4$, the output of the ideal voter is still the true average, namely $$V_o\text{ ideal}=(V_1+V_2)/2 \qquad (4)$$

The circuit cannot however provide correct outputs if $V_3$ and $V_4$ both fail simultaneously in the same direction, because there is not sufficient information to make a selection when two signals are correct and two are failed in similar fashion. The situation is similar when only two inputs are left and one fails. In this case, the threshold detectors cannot decide which signal has failed.

The idealized versions used as examples serve only to simplify the description of the principle of operation. If the actual circuits were implemented with analog switches and threshold detectors there would be little hardware advantage over the median value selection voter.

Referring again to the actual circuits 10, 20, 30, 40 illustrated in FIG. 1, it can be seen that the analog switch and threshold detector of each branch of each network are replaced by two simple diodes. The operation of these diodes is as follows. When the difference between the voltage at the branch node, e.g., 95 and output voltage $V_o$ is less than the threshold voltage of the diode, no currents are flowing in the diodes and $V_o$ is for all practical purposes disconnected from node 95. However, when the difference between $V_o$ and the voltage at the node becomes larger than the specified tolerance, one of the two diodes depending on polarity becomes forward biased. This connects $V_o$ to the node through a low impedance. How low this impedance is depends on the magnitude of the difference and the type of the diode. Hence, the diodes provide a gradual disconnect of any failing input signal.

In the normal mode of operation, when the four input voltages $V_1$, $V_2$, $V_3$, and $V_4$ are within the specified tolerances, the circuit of FIG. 1 continues to operate as the equivalent circuit of FIG. 3. Consequently, the output voltage is the true average of the input voltages, as defined by equation 1.

In the failure modes of operation, however, the performance of the preferred embodiment of circuit illustrated in FIG. 1 differs from the idealized version of FIG. 2. The reason for this is that the diodes are not ideal switches but have a large offset voltage and a finite ON resistance. Both of these parameters vary with the magnitude of the current flowing through them, with environmental conditions and with other parameters of the device. Fortunately, neither the offset voltage nor the ON resistance of the diodes is critical to the operation of the voter.

For purposes of simplification of the description of the voter, the ON-resistance of the diodes is assumed to be zero and the offset voltage is assumed to be equal to the drop across the diode with a nominal current ($1 mA$) flowing through it. Therefore, each diode can be regarded as a device with infinite impedance when the voltage across it is less than a certain threshold value. When the voltage across it is larger than the threshold value, the impedance goes to zero, with a voltage $V_B$ equal to the threshold, connected in series. This voltage makes this circuit different from the ideal one.

Assume now the case in which one but only one input signal, i.e., $V_4$, fails. The equivalent circuit is as shown in FIG. 4 inclusive of battery 67 and the operation is as described above —— the battery serving only to assist analysis by providing a potential equivalent to the voltage drop across the diodes.

In the preferred embodiment, FIG. 1, any of diodes 71, 72, 73, 74 would conduct when $V_o$ is larger than the voltage at the corresponding node plus the threshold voltage of the diode —— represented as $V_B$ above. Similarly, any of diodes 75, 76, 77, 78 would conduct when $V_o$ is smaller than the voltage at the node minus $V_B$. The value of resistors 51, ... 58 is chosen on the basis of a rationalization of two divergent premises. The ratio of $R_{51}$ to $R_{55}$, $R_{52}$ to $R_{56}$, etc. which are identical should be kept as small as possible so as to produce the largest possible voltage at the nodes of the resistor-diode network branches. The input side resistors 51, 52, 53, 54 should be large enough to limit the output current of the amplifier, which is also to say current through the diodes, to a reasonable value. As a practical matter a ratio of $R_{51} : R_{55}$ of the order of 1:5 is good and using resistances of 10 kilohms and 50 kilohms is appropriate since that will produce 1 milliampere of current in the voltage range used. The resistors used should be nominally identical, i.e., within one percent but one advantage of the present invention stems from the fact that precision resistors are not required. With these values, 10 and 50 kilohms for left and right side resistors respectively in the illustrations, the voltage $V_{98}$ at the node in branch 14 of the FIG. 4 example can be verified as $V_{98} = 7/8\ V_4$, the input voltage as explained below.

The voter output voltage can now be calculated. Again to simplify the description, it is assumed that $V_1 = V_2 = V_3 = 0$ and that $V_4$ differs from the majority of inputs. The magnitude of the difference is thus equal to $\pm V_4$. From the equivalent circuit in FIG. 4 which for this purpose can be regarded as having a single resistance 50 to ground substituted for resistors 51, 55, 52, 56, 53, 57 as illustrated in FIG. 5 it follows that:

$$V_{98} \pm V_B = V_o \quad (5)$$

Figure 5:
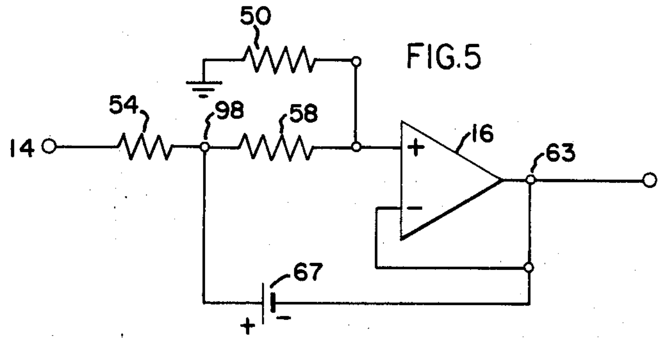

Considering the value of the resistors discussed previously, i.e., 10 kilohms for resistors 51, 52, 53 and 50 kilohms for 55, 56, 57, the value of a single resistance 50 to be substituted in FIG. 5 would be 20 kilohms. On this basis, the resistor 54 is related to the others in the ratio of 1:7 and the voltage $V_{98}$ at the node of branch 14 would be 7/8 of $V_4$ the input voltage at 4.

Since $V_{98} = 7/8\ V_4$, and $V_o = 2/8\ V_4$;

$$7/8\ V_4 - 2/8\ V_4 = 5/8\ V_4 = \pm V_B \quad (6)$$

Substituting again $V_o = 2/8\ V_4$, gives:

$$V_o = (\pm 1/4) \cdot (8/5)\ V_B = \pm 2/5\ V_B. \quad (7)$$

Figure 6:
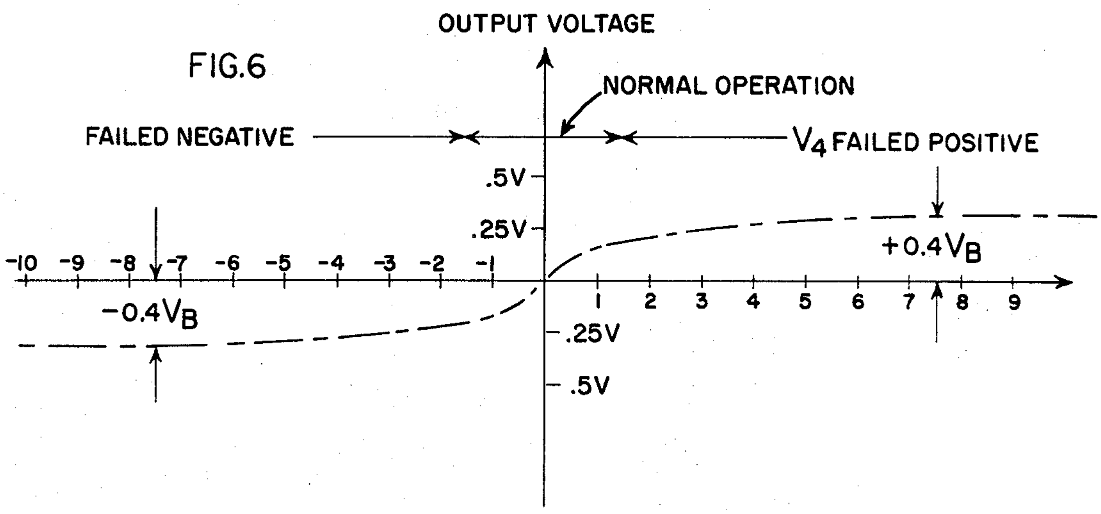
FIG. 6 is a diagram depicting the input/out relation of the limited average voter when the channel input signals $V_A = V_B = V_C = 0$ and a fourth input signal $V_D$ varies between $+10V$ and $-10V$.

This input/output relationship is confirmed by the plot of experimental data displayed in FIG. 6. This data also relates to the example $V_1 = V_2 = V_3 = 0$; $V_4$ within the range ±10 assumed for purposes of demonstration. The curve there states that as $V_4$ varies between $-10V$ and $+10V$ the maximum change in the output will be $\pm 0.4\ V_B$; where $V_B$ is the voltage drop across the diode. Note that the actual curve changes gradually. First, the change is linear with $V_4$ because $V_4$ is still within tolerances and the voter in its normal operation. But as the diodes start conducting, the curve flattens.

The maximum deviation of the $V_o$ from the true average (zero volts in this case) is $\pm 0.4\ V_B$ no matter how fast the signal fails. The objective is to make $\pm 0.4\ V_B$ an acceptable small percentage of full scale.

The magnitude of $V_B$ has been discussed briefly and it was pointed out that $V_B$ is a function of the diode parameters and the magnitude of the current flowing through it. In the circuit channel 10 of FIG. 1 the values of the resistors were chosen so that the maximum current through the diodes is 10V/10K = 1$m$A. With such a current $V_B$ is primarily a function of the type of diode used. The types listed below are known to have the following voltage drops:

| | |
|---|---|
| silicon diode | ≈ 0.7V |
| hot carrier diode | ≈ 0.35V |
| ion implanted diode | ≈ 0.2V |
| germanium diode | ≈ 0.1V |

Accordingly, the maximum deviations of the voter from a true average in a ±10V full scale system are:

| | |
|---|---|
| silicon diode | ≈ ±3% |
| hot carrier diode | ≈ ±1.5% |
| ion implanted diode | ≈ ±0.8% |
| germanium diode | ≈ ±0.4% |

The foregoing disclosure has been based on application of the invention to a quadruplex system but the invention is applicable to other plural or redundant configurations.

I claim:

1. An analog voter of the averaging type for use in redundant circuitry comprising a signal processing channel including an averaging network connected to a plurality of separate signal sources through individual branches for producing at the output terminal of said network an average signal that is the average of distinct analog signals introduced at said sources intermittently conductive means coupled to said branches and controlled by a feedback means from the output of the averaging network for applying a voltage to said branches to clamp the input voltage to the averaging means from any branch at a predetermined level whenever the excursion of the input analog signal level to that branch exceeds the average signal by a predetermined amount.

2. The analog voter of claim 1 wherein said intermittently conductive means includes a voltage sensitive conductive device having a discreet threshold potential to establish the predetermined voltage difference between the input analog signal and the average signal required to clamp the voltage at said branch to the average output level.

3. The analog voter of claim 1 wherein said averaging network includes a plurality of substantially identical network branches converging from said sources to a single amplifier and each said branch includes two resistances separated by a node.

4. The analog voter of claim 2 wherein said voltage sensitive conductive device includes a unidirectional conductive means coupled to each of said branches.

5. The analog voter of claim 4 wherein said, unidirectional conductive means includes a pair of oppositely poled unidirectional conductive devices.

6. The analog voter of claim 4 wherein said unidirectional conductive means includes a pair of oppositely poled diodes.

7. In an analog voter for use in redundant circuitry having an averaging network connected to a plurality of separate signal sources for producing, at the output terminal of said network, a signal that is the average of distinct analog signals introduced at said sources, said network including a plurality of branches, one for each said source, intermittently conductive means for selectively applying a voltage to the network branches to clamp the voltage from a given branch to the averaging network at a predetermined level whenever the excursion of the input analog signal level to that branch exceeds the average signal by a predetermined amount.

8. In an analog voter for use in redundant circuitry having a plurality of substantially identical branch circuits containing resistances converging from separate input terminals to an input connection of a single unity gain amplifier whereby said amplifier produces an output signal at its output terminal that is the average of analog signals introduced at said separate input terminals, each branch circuit including two resistances connected in series and separated by a node, feedback means from the output of the unity gain amplifier to each said node for clamping the voltage at the node to the average output level from the remaining signals whenever the input signal excursion at any given branch exceeds the average signal by a predetermined amount including intermittently conductive means sensitive to a voltage difference for selectively connecting the output of said unity gain amplifier to said nodes whenever the analog signals at said node exceeds the average of analog signals by a predetermined amount to thereby clamp the voltage at said node.

9. The analog voter of claim 8 wherein said means sensitive to a voltage difference includes a voltage sensitive conductive means having a discrete threshold potential to establish the predetermined voltage difference between the analog input signal and the average output required to drive the device into conduction and clamp the voltage at the node to the average output level.

10. The analog voter according to claim 9 wherein said voltage sensitive conductive means includes a unidirectional conductive means.

11. The analog voter according to claim 10 wherein said voltage sensitive unidirectional conductive means includes a pair of oppositely poled unidirectional conductive devices.

12. The analog voter according to claim 8 wherein the intermittently conductive voltage sensitive means includes a diode.

13. The analog voter according to claim 9 wherein said intermittently conductive voltage sensitive means includes a pair of oppositely poled diodes.

* * * * *